Figure 1:
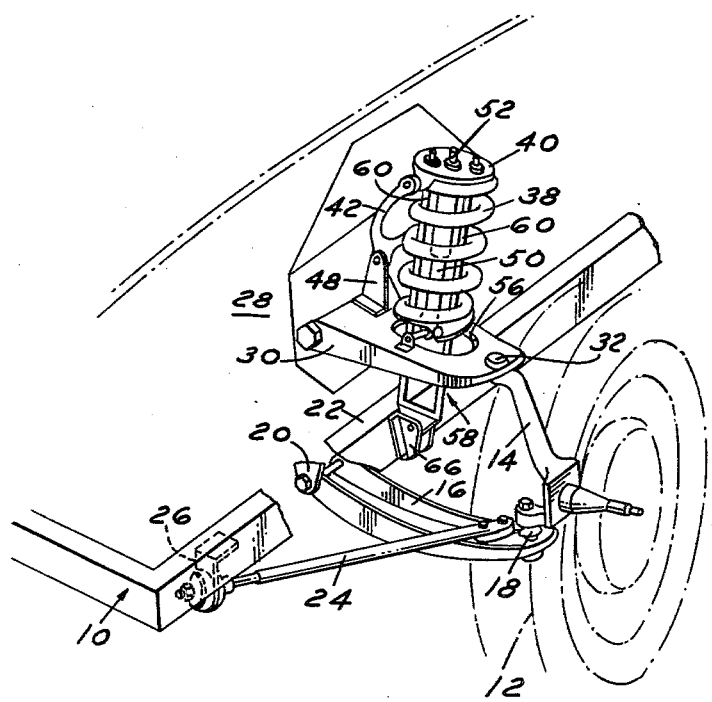

July 6, 1965  H. F. BEHLKE  3,193,304
VEHICLE SUSPENSION SYSTEM HAVING AN ARTICULATED SPRING SUPPORT
Filed Dec. 23, 1963  2 Sheets-Sheet 1

HERBERT F. BEHLKE
INVENTOR.
BY John R. Faulkner
Clifford L. Sadler
ATTORNEYS

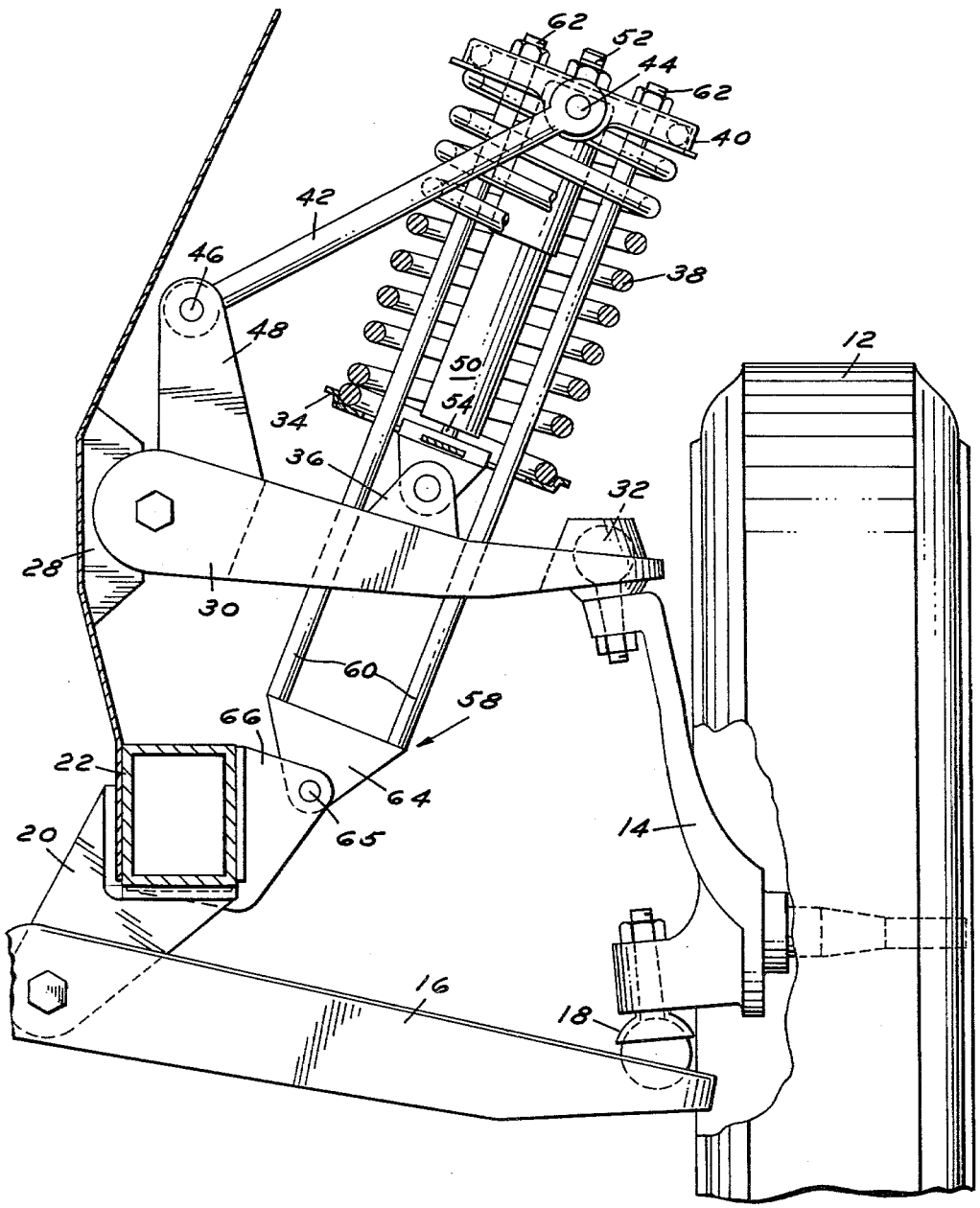

United States Patent Office 3,193,304
Patented July 6, 1965

3,193,304
VEHICLE SUSPENSION SYSTEM HAVING AN ARTICULATED SPRING SUPPORT
Herbert F. Behlke, Milford, Mich., assignor to Ford Motor Company, Dearborn, Mich., a corporation of Delaware
Filed Dec. 23, 1963, Ser. No. 332,643
4 Claims. (Cl. 280—124)

The present invention relates generally to independent suspension systems, and more particularly to a novel arrangement for incorporating a coil spring in an independent suspension.

The present invention in particularly adaptable to independent front suspensions of the automotive type in which upper and lower suspension arms position a wheel support member with respect to a vehicle chassis. In certain vehicles, particularly those of the unit body or integral frame type, certain advantages are realized by mounting the suspension spring upon the upper suspension arm with the upper end of the coil spring seated in body structure. With such an arrangement, means must be provided to keep the coil spring from buckling when the upper suspension arm pivots between extreme jounce and rebound. In addition, reinforcements are required in the area of the fender apron to support the upper spring seat.

In view of the prior art, the present invention provides a suspension construction that achieves the packaging advantages of a coil spring that is located above the upper suspension arm, but eliminates the usual disadvantages associated therewith.

According to the presently preferred embodiment of this invention, a lower spring seat is pivotally connected to the upper suspension arm. An upper spring is positioned by a linkage system extending from the suspension arm. A coil spring is interposed between the two spring seats. The upper spring seat is connected by a tension member that extends through the arm to a frame bracket situated between the upper and lower arms. This arrangement positions the spring in a convenient area but distributes the spring forces to rugged frame members that do not require special reinforcement.

The many objects and advantages of this invention will be readily apparent from consideration of the following description and the accompanying drawings, in which:

FIGURE 1 is a perspective view of an independent front suspension incorporating the present invention; and FIGURE 2 is an elevational view of the suspension of FIGURE 1.

Referring now to the drawings, FIGURE 1 discloses an independent suspension for supporting a vehicle chassis 10 upon a road wheel 12. The wheel 12 is rotatably mounted on a wheel support member 14.

A lower suspension arm 16 is connected to a ball joint assembly 18 which, in turn, is also connected to the wheel support member 14. The inner end of the lower arm 16 is pivotally joined to a bracket 20 that has been welded to the frame member 22. The lower suspension arm 16 is positioned longitudinally by a drag strut 24 that has its outer end riveted to the outer end of the lower arm 16. A bracket 26, depending from the frame side rail 22, supports the inner or forward end of the strut 24.

An upper suspension arm 30 is pivotally connected at its inner end to the sheet metal support 28 extending upwardly from the side rail 22. The upper arm 30 has a connection at its outer end to a ball joint assembly 32. The ball point 32, in turn, is affixed to the wheel support member 14.

The upper and lower suspension arms 30 and 16 position the wheel support 14 laterally with respect to the chassis 10 during jounce and rebound movement of the wheel 12. The drag strut 24 provides support for longitudinal forces such as occur during braking.

Spring means are provided to support the chassis 10 upon the suspension. A lower spring seat 34 has a pivotal connection with a bracket 36 extending upwardly from the upper suspension arm 30. A coil spring 38 has its lower end positioned on the spring seat 34.

A sheet metal upper spring seat 40 receives the upper end of the coil spring 38. A yoke shaped link 42 has a pivotal connection at 44 with the upper spring seat 40. The other end of the yoke 42 is pivotally connected at 46 to a bracket 48 that extends upwardly from the suspension arm 30 in the region of its pivotal connection with the chassis portion 28. The upper end of the spring 38 and its spring seat 40 are positioned, in part, by the yoke 42.

A telescopic shock absorber 50 is positioned within the coil spring 38 and has an upper end 52 connected to the upper spring seat 40. The lower end 54 of the shock absorber 50 is secured to the lower spring seat 34.

As noted in FIGURE 1, an opening 56 is provided in the upper arm to accommodate articulation of the lower spring seat 34. In addition, the opening 56 permits a tension member 58 positioned within the coil spring 38 to transfer the spring load from the upper seat 40 to the frame member 22. The tension member 58 comprises a pair of rod-like leg portions 60 that are threaded at their upper ends 62 to provide a bolted connection to the upper spring seat 40. The lower ends of the rods 60 are secured to a plate 64 that is pivotally connected at 65 to a bracket 66. The bracket 66, in turn, is welded to the frame side rail 22.

Unlike the conventional suspension system, both the upper and lower spring seats traverse an arcuate jounce and rebound path when the wheel 10 passes over a road obstacle. The upper spring seat 40 moves along an arc having the pivot pin 65 between members 64 and 66 as its centers. Its location on the arc is determined by its connection through link 42 with the suspension arm 30.

One of the advantages of this suspension over other arrangements heretofore known is that reinforcement of the front fender apron is eliminated.

The foregoing description presents the presently preferred embodiments of this invention. Alterations and modifications may occur to those skilled in the art that will come within the scope and spirit of the following claims.

What is claimed as new is:

1. A vehicle suspension system having a chassis, a wheel, a support member for said wheel, a lower suspension arm, an upper suspension arm, said suspension arms pivotally interconnecting said chassis and said wheel support member, a lower spring seat pivotally connected to said upper arm, an upper spring seat, a coil spring interposed between said upper and lower spring seats, a link system interconnecting said upper seat and said upper arm, a tension member positioned within said coil spring and having its upper end secured to said upper spring seat and its lower end pivotally connected to said chassis, a telescopic shock absorber interconnecting said spring seats.

2. A vehicle suspension system having a chassis, a wheel, a support member for said wheel, a lower suspension arm, an upper suspension arm, said suspension arms pivotally interconnecting said chassis and said wheel support member, a lower spring seat pivotally connected to said upper arm, an upper spring seat, a coil spring interposed between said upper and lower spring seats, a link system interconnecting said upper seat and said upper arm, a tension member positioned within said coil spring and having its upper end secured to said upper spring seat and its lower end pivotally connected to said chassis.

3. A vehicle suspension system having a chassis, a wheel, a support member for said wheel, a lower suspension arm, an upper suspension arm, said suspension arms pivotally interconnecting said chassis and said wheel support member, a lower spring seat pivotally connected to said upper arm, an upper spring seat, a coil spring interposed between said upper and lower spring seats, a link system interconnecting said upper seat and said upper arm, a member constructed for transferring spring forces from said upper spring seat to said chassis.

4. A vehicle suspension system having a chassis, a wheel, a support member for said wheel, a suspension arm pivotally interconnecting said chassis and said wheel support member, a spring seat pivotally connected to said arm, a second spring seat, a spring interposed between said spring seats, a link system interconnecting said second seat and said arm, a member constructed for transferring spring forces from said second spring seat to said chassis.

References Cited by the Examiner

UNITED STATES PATENTS

| 2,262,310 | 11/41 | Wooldridge | 267—20 |
| 2,290,923 | 7/42 | Wahlberg | 280—124 |
| 2,351,291 | 6/44 | Ross | 267—20 |
| 3,039,788 | 6/62 | Farago | 267—20 |

A. HARRY LEVY, *Primary Examiner.*